United States Patent [19]

Possati et al.

[11] Patent Number: 5,068,974
[45] Date of Patent: Dec. 3, 1991

[54] APPARATUS FOR CHECKING DIMENSIONS OF WORKPIECES

[75] Inventors: Mario Possati; Guido Golinelli, both of Bologna, Italy

[73] Assignee: Marposs Societa' per Azioni, S. Marino di Bentivoglio (BO), Italy

[21] Appl. No.: 378,194

[22] PCT Filed: Nov. 3, 1988

[86] PCT No.: PCT/IT88/00077

§ 371 Date: Jun. 16, 1989

§ 102(e) Date: Jun. 16, 1989

[87] PCT Pub. No.: WO89/04455

PCT Pub. Date: May 18, 1989

[30] Foreign Application Priority Data

Nov. 9, 1987 [IT] Italy ................. 3683 A/87

[51] Int. Cl.⁵ .................... G01B 5/20; G01B 7/28
[52] U.S. Cl. ........................ 33/549; 33/552; 33/572; 33/573
[58] Field of Search ............... 33/549, 551, 552, 555, 33/572, 573, 568, 783, 805

[56] References Cited

U.S. PATENT DOCUMENTS

| 1,587,217 | 6/1926 | Damerall | 33/805 |
| 2,609,609 | 9/1952 | Moss | 33/549 |
| 2,854,756 | 10/1958 | Aller | 33/552 |
| 3,011,780 | 12/1961 | Hanisko | |
| 3,264,741 | 8/1966 | Brebant | 33/549 |
| 3,281,995 | 11/1966 | Parrella et al. | 33/550 |
| 3,302,920 | 2/1967 | DuPage et al. | 33/557 |
| 3,350,785 | 11/1967 | Rawstron et al. | 33/549 |
| 3,905,116 | 9/1975 | Roberts | |
| 4,006,529 | 2/1977 | Herman | 33/573 |
| 4,122,608 | 10/1978 | Hopf | 33/549 |
| 4,233,744 | 11/1980 | Possati | |
| 4,604,810 | 8/1986 | Gusching et al. | 33/555 |

FOREIGN PATENT DOCUMENTS 837608 4/1952 Fed. Rep. of Germany .
1507371 12/1967 France .

Primary Examiner—Thomas B. Will
Attorney, Agent, or Firm—Stevens, Davis, Miller & Mosher

[57] ABSTRACT

An apparatus for checking linear dimensions and other features of workpieces (42) comprises a support structure (2) carrying reference and support devices (40) adapted for supporting the workpiece to be checked (42). A linear support frame (210) carrying measuring heads (230) is connected to the support structure (2) through a coupling device (88) directly coupled to the support frame (210), substantially in a single limited zone for preventing deformations of the support frame (210).

10 Claims, 9 Drawing Sheets

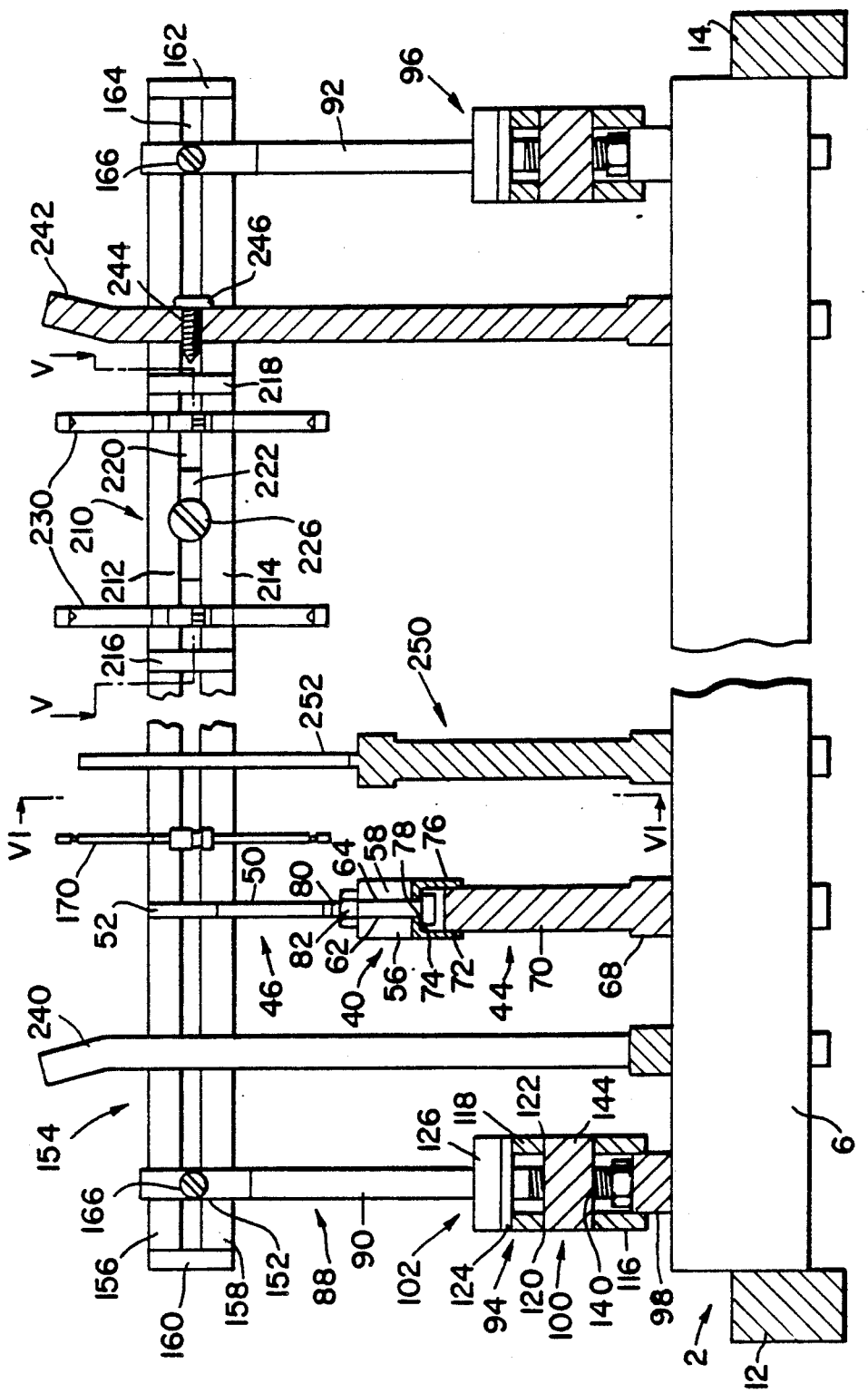

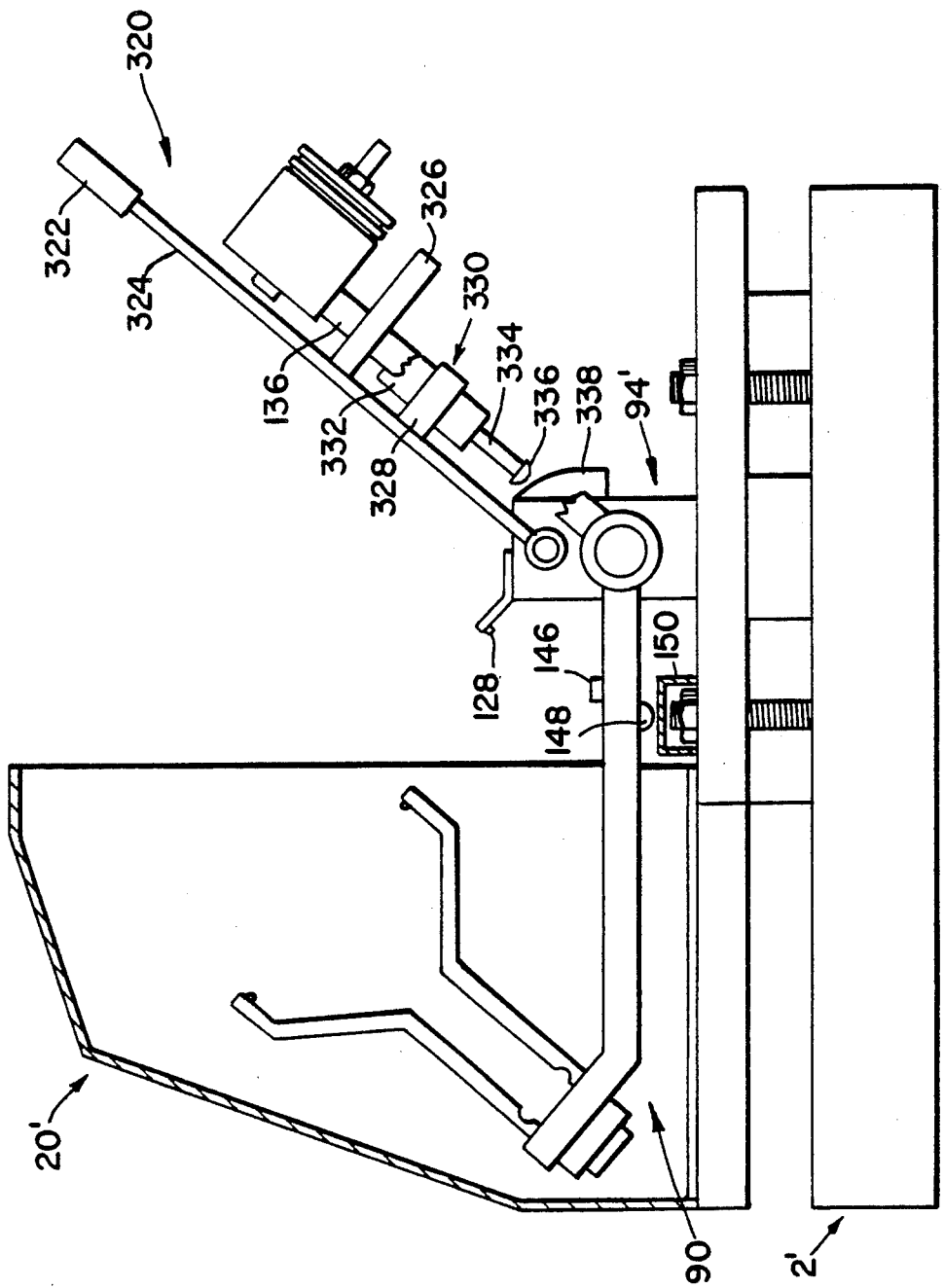

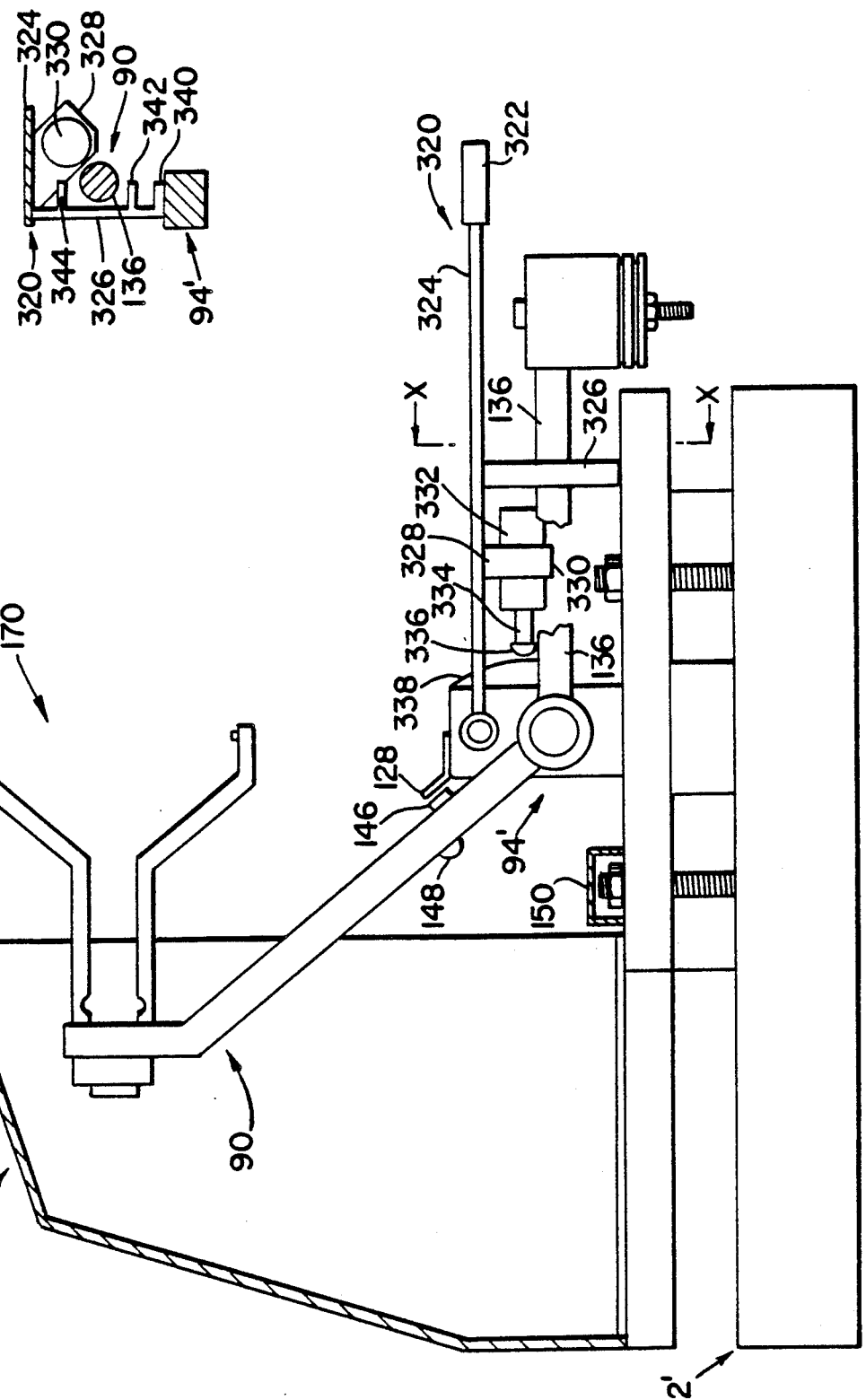

APPARATUS FOR CHECKING DIMENSIONS OF WORKPIECES

DESCRIPTION

1. Technical Field

The invention relates to an apparatus for checking dimensions of workpieces, with a support structure; reference and support means, coupled to the support structure, for supporting and positioning the workpiece to be checked; a support frame carried by the support structure; measuring means fixed to the support frame; and coupling means for coupling the support frame to the support structure, the coupling locations of the reference and support means and of the support frame being basically different.

2. Background Art

U.S. Pat. No. US-A-4233744 to Possati relates to a bench gauge including a support structure carrying a nosepiece ensuring centering and providing a mechanical reference for a workpiece to be checked. A support frame consisting of a plate with three guide slots is coupled to the support structure through three connection elements having a flexible section and arranged at spaced apart locations, in order to reduce the transmission to the plate of stresses and deformations originated in the support structure.

The plate carries a plurality of measuring heads, each of which is coupled to the plate by a plurality of spaced apart connection screws passing through one of the slots. The bench gauge is adapted for checking, statically or dynamically, inside diameters, outside diameters and other characteristics, in particular by combining the signals of different measuring heads.

In this known bench gauge, due to the size and arrangement of the plate and its coupling to the support structure, and also in view of the possibly high number of heads carried by the plate and of their coupling to the plate, the plate is still subject to considerable forces and deformations that can detrimentally affect the accuracy and repeatability of the gauge, in particular as far as combined measurements are concerned.

DISCLOSURE OF INVENTION

The invention is intended to overcome the drawbacks of the prior art, by permitting the obtainment of an apparatus in which measuring means—in particular measuring means providing signals adapted to be processed for performing combined measurements—are carried by a support frame that is not subject to substantial stresses and deformations causing modification of the mutual arrangement of the measuring means.

According to the invention, an apparatus for checking dimensions of workpieces comprises a support structure; reference and support means coupled to the support structure for supporting and positioning the workpiece to be checked; a support frame carried by the support structure; measuring means fixed to the support frame; and coupling means for coupling the support frame to the support structure. The coupling means comprise a coupling device directly coupled to the support frame, substantially in a single limited zone or in locations arranged close to one another, for preventing deformations of the support frame. The coupling of the support frame is made in a location basically different from those where the reference and support means are coupled to the support structure.

The effects and advantages offered by the invention are that the measuring devices to be used for performing combined measurements are not subjected to substantial, undesired mutual displacements and therefore the accuracy and repeatability of the combined measurement are very good. The support frame can be very light and compact and this is of advantage for several reasons, e.g. for increasing the availability of space, for rendering simpler the construction of an apparatus in which the support frame has to be movable, etc. Moreover, the support structure, the kinematic elements and the control means of the apparatus need not be of high precision and consequently the manufacturing costs decrease.

BRIEF DESCRIPTION OF DRAWINGS

Specific embodiments of the invention are now described in detail with reference to the enclosed tables of drawings, given by way of example and not of limitation, in which.

BEST MODES FOR CARRYING OUT THE INVENTION

Figure 1:
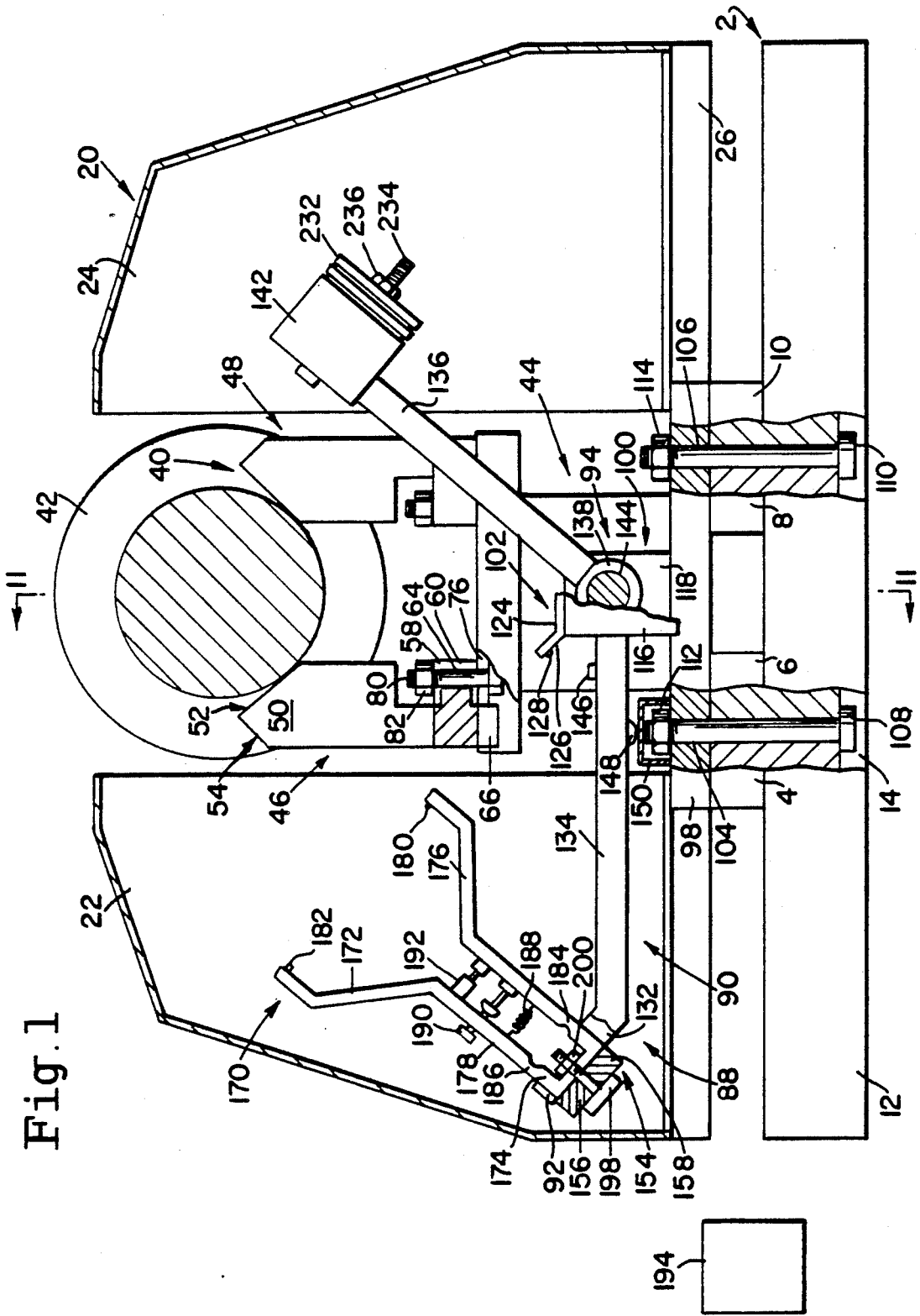
FIG. 1 is a transversal partially sectional view of a bench gauge according to the present invention with some parts furtherly sectioned in order to evidence some details.
Figure 2:
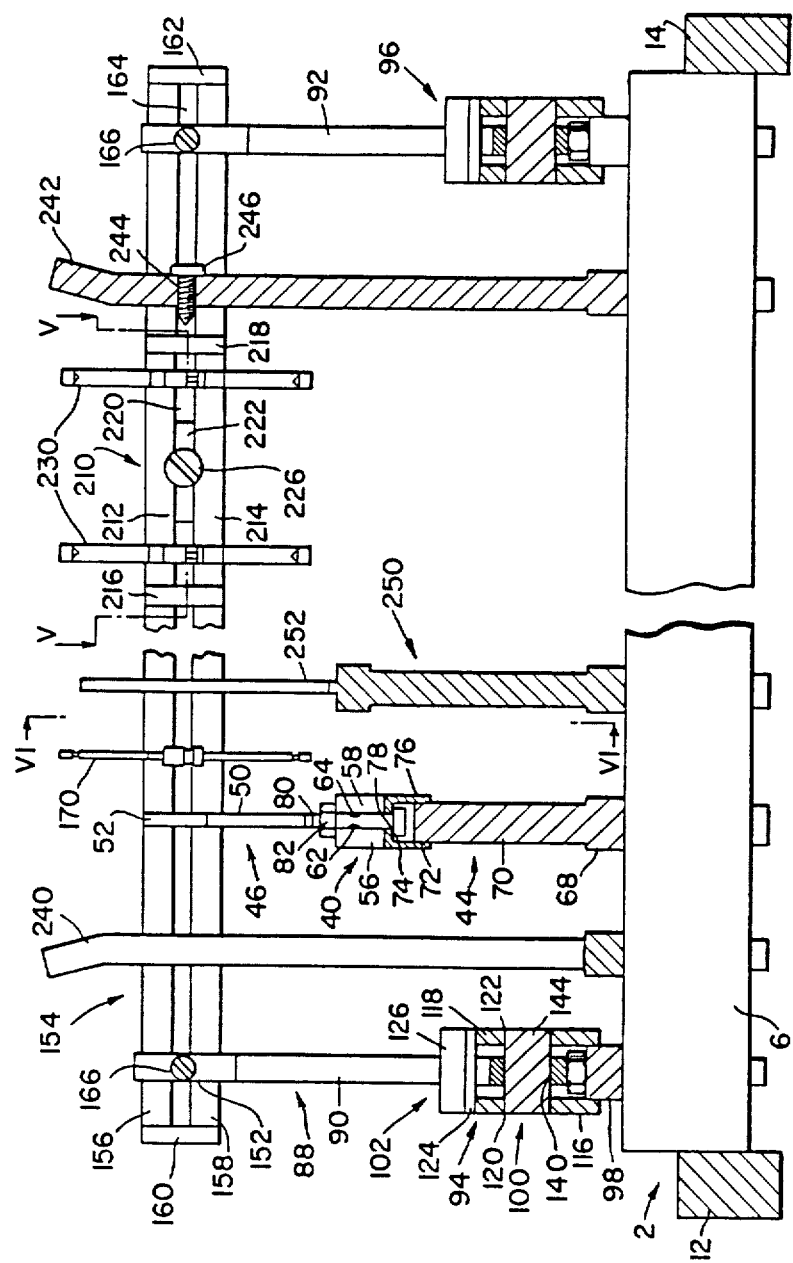
FIG. 2 is a longitudinal sectional view of the bench gauge shown in FIG. 1 along the path II—II in FIG. 1, with the omission of some elements and others placed in a different position with respect to FIG. 1, for clarity reasons.
Figure 6:
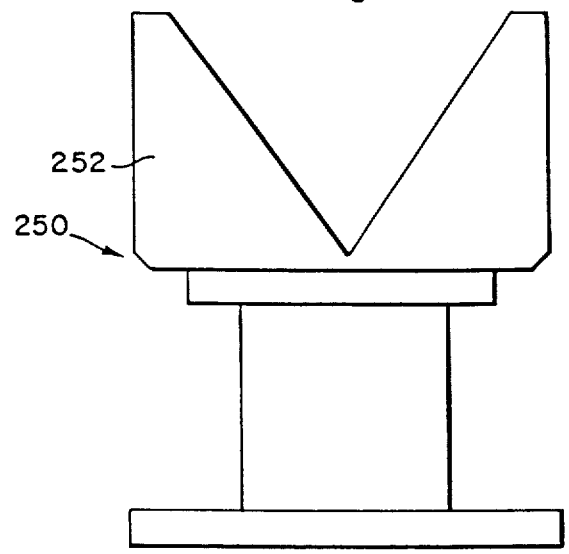
Figure 7:
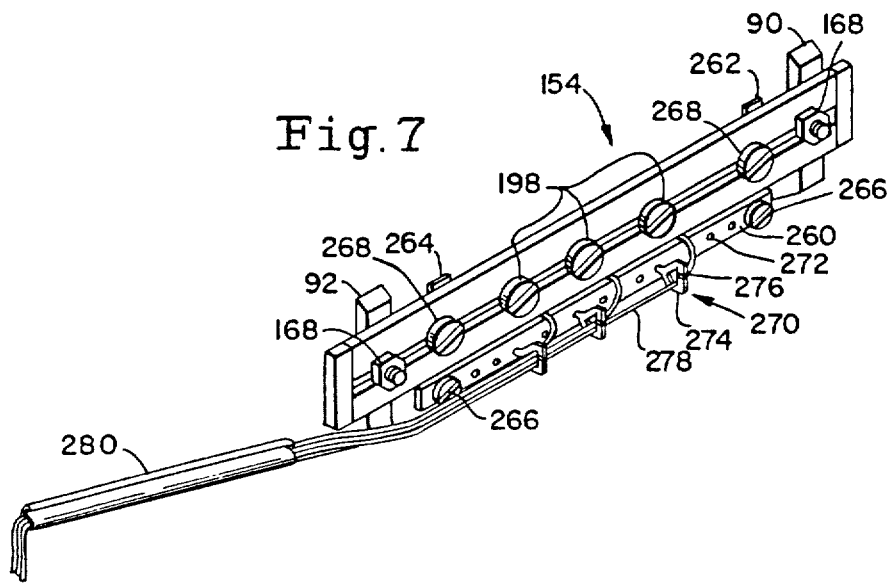
Figure 8:
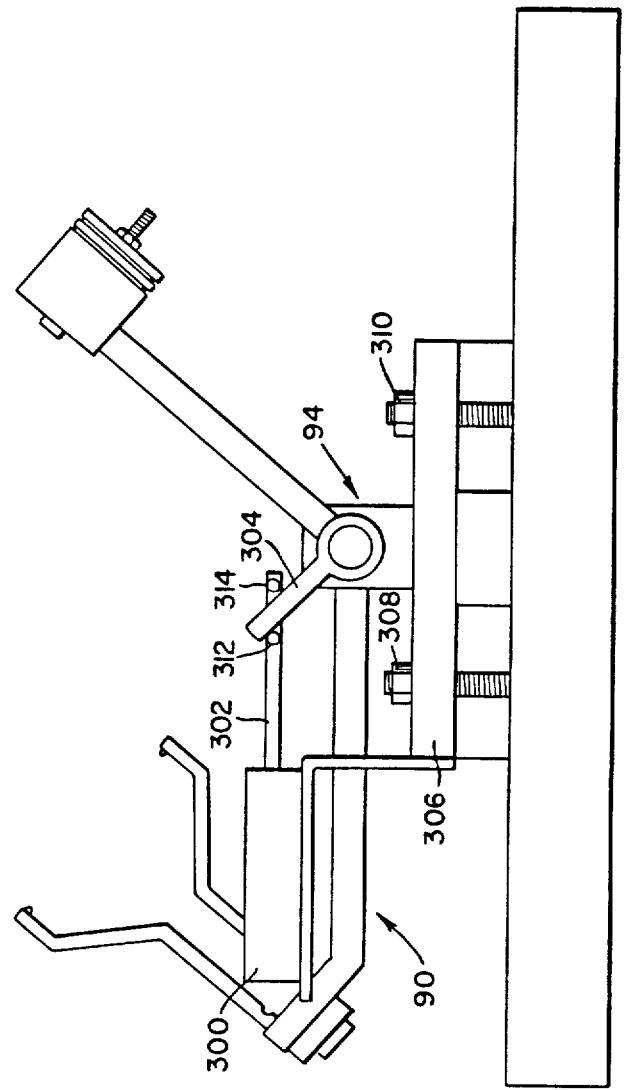

The bench gauge shown in FIGS. 1 and 2 comprises a support structure including a base, or bed 2 (also shown in FIG. 3), with two pairs of longitudinal bars having a rectangular cross-section 4, 6 and 8, 10 fixed at their ends in a mutually parallel way to two crosspieces 12 and 14. Coupling may be made, for example, by welding. Longitudinal openings 16 and 18 defined by the pairs of longitudinal parallel bars 4, 6 and 8, 10, respectively, form longitudinal guides.

A protection structure 20 (also shown in FIGS. 4A and 4B) comprises two halfshells 22 and 24 joined at the base by two parallel flat bars 26 and 28.

Figure 4A:
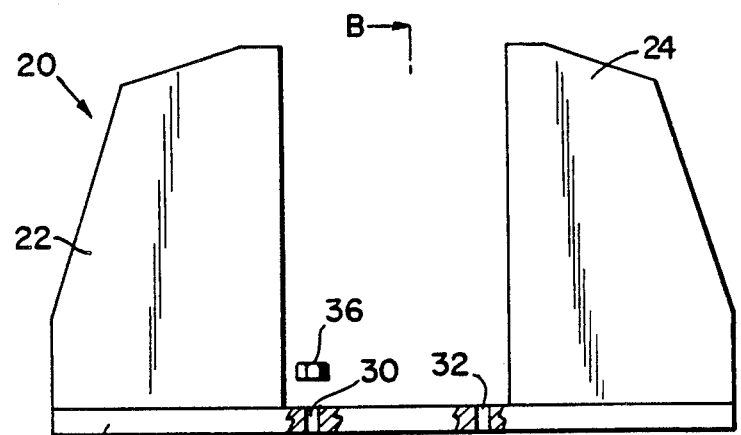
FIGS. 4A and 4B are respectively a front view with some details in a sectional view and a longitudinal sectional view along the path B-B in FIG. 4A, of a second detail of the bench gauge shown in FIG. 1, with a different scale as compared to that of FIG. 1.

Structure 20 is positioned on bed 2 in such a way that the flat bars 26, 28 are arranged in a transversal position with respect to the two pairs of bars 4, 6 and 8, 10. Both flat bars 26, 28 have two through holes 30 and 32 (just those of flat bar 26 are shown in FIG. 4A) formed in such positions so as to arrange themselves in correspondence to openings 16 and 18, respectively. Structure 20 is secured to bed 2 by means of bolts (as an example just one is shown in FIG. 4A) consisting of screws 34 with a hexagonal head inserted in openings 16 (18) and in through holes 30 (32), and of nuts 36 that are fastened to said screws so contacting against the upper surface of flat bars 26, 28; the heads of screws 34 are thus urged against the bottom surface of bars 4, 6 (8, 10).

Reference and support means comprise two rest devices 40 (only one is shown in FIG. 1), for supporting a workpiece 42 to be checked with its geometrical axis horizontally arranged. The rest devices 40 comprise support members 44 arranged on base 2 according to mutually parallel transversal directions and pairs of reference elements 46, 48 each adapted for being secured to one of said members 44. The reference elements, and more specifically element 46, have a first portion 50 with two rest surfaces 52 and 54 that have a different inclination, adapted for being arranged in a symmetrical way with respect to similar surfaces of element 48 and about an axis defined by associated support member 44, in such a way so as to define V-shaped rests for workpiece 42 with different sloping surfaces if the sides of the V are the pairs of surfaces 52 or 54 respectively.

Reference element 46 (just like element 48) further comprises a clamping portion with two parallel blocks 56 and 58 coupled, for example welded, to the first portion 50 and with a free end, that define an opening 60; the width of said opening 60 is limited, near the free ends of blocks 56 and 58, by welding spots 62 and 64. An end part of portion 50 opposite to rest surfaces 52 and 54 forms a centering overhang 66.

Support member 44 basically comprises three parts: a coupling portion 68, a central body 70 and a support part 72. The coupling portion 68, shown in FIG. 2 only, comprises two through holes for the coupling of the whole rest device 40 to bed 2, and more specifically to the pairs of longitudinal bars 4, 6 and 8, 10, in a completely similar way as that described for the protection structure 20. Portion 68 of member 44 is fully identical to a part 98 shown in FIGS. 1 and 2 (and pertaining to another device of the bench gauge) that will be described hereinafter and is coupled to bed 2 in the same way as this one. It should be realized that this particular method of coupling enables a continuous adjustment of the longitudinal position of the rest devices 40.

Support part 72 comprises two elongated portions with an "L" shaped section 74 and 76, coupled near the upper edges of the central body 70 in such a way that the bases of the Ls face each other so as to form a transversal seat 78. The fixing of each of reference elements 46, 48 to coupling portion 68 of support member 44 is made in the following way: element 46 (48) is placed on body 70 so that overhang 66 is inserted in seat 78 and blocks 56 and 58 rest on portions 74 and 76, respectively. A screw 80 is inserted between portions 74, 76 in such a way that its threaded part protrudes in between the bases of the Ls in seat 78 and is inserted in opening 60 of element 46 (and is held there thanks to welding spots 62, 64 that limit the opening width at the open end). A nut 82 locked at the end of screw 80 urges against surfaces of blocks 56, 58, and consequently the head of screw 80 is clamped against internal surfaces of sections 74, 76. This clamping of screw 80 and the cooperating of overhang 66 against the surfaces of seat 78 so bring about the locking of element 46 to support member 44. In an entirely similar way element 48 is also clamped to support member 44.

The possibility of adjusting the mutual position of the reference elements 46, 48 in a transversal direction as above described and the availability of two pairs of rest surfaces (52 and 54) with a different inclination enable rest devices 40 to ensure a correct positioning of workpieces 42 to be checked as the nominal dimensions of the different workpieces (and/or of different sections of a same workpiece) vary—within a broad range—, while maintaining substantially constant the position of the workpiece axis.

Coupling means comprise another support structure 88 including rotary arms 90 and 92 connected to support devices or supports 94 and 96 secured to bed 2. As the arms 90, 92 and associated supports 94, 96 are similar to each other, the description hereinafter refers to arm 90 and associated support 94 only, as shown in FIGS. 1 and 2.

Support 94 comprises a portion 98 for coupling to bed 2, a fulcrum section 100 that defines, together with the corresponding fulcrum section of support 96, an axis of rotation for arms 90, 92 and for the entire support structure 88, and a limit stop part 102.

Portion 98 has two through holes 104 and 106, specifically placed in positions so as to be arranged in correspondence to openings 16 and 18, respectively, when support 94 rests on bed 2.

Support 94 is secured to bed 2 by means of bolts consisting in screws 108, 110 that are inserted in openings 16, 18 and in through holes 104, 106 and nuts 112, 114 that are locked to said screws urging against the upper surface of portion 98; the heads of screws 108, 110 are thus urged against the bottom surface of the pairs of bars 4, 6 and 8, 10.

The fulcrum section 100 comprises two rectangular plates 116, 118, having edges coupled (for example welded) to portion 98, so as to arrange themselves in a vertical and parallel way with respect to each other. Plates 116, 118 have through holes 120, 122 that are aligned along an axis of rotation, and the plates are joined to limit stop part 102, at their edges opposite the above mentioned edges The latter part 102 substantially comprises two rectangular reciprocally sloping portions 124, 126, one of which, 124, is horizontally arranged and coupled (welded) to the edges of plates 116, 118, as previously mentioned; the other portion, 126, carries a reference abutment 128.

Rotary arm 90 comprises: a first elongated portion 132, a second elongated portion 134—angularly coupled to the first—a third elongated portion 136 with a circular cross-section, an annular portion 138—that connects said second and third elongated portions 134 and 136 in such a way that these portions 134, 136 are reciprocally sloping —, the annular portion 138 comprising a hole 140 with an axis arranged transversally with respect to elongated portions 134, 136, and a counterweight end portion 142 connected to the third elongated portion 136.

Arm 90 is inserted between plates 116, 118 of fulcrum section 100 of support 94, in such a way that the transversal axis of hole 140 is aligned with the above mentioned axis of rotation.

A cylindrical pin 144 is inserted through hole 140 of portion 138 and holes 120, 122 of plates 116, 118 so as to connect arm 90 to support 94 in such a way that the latter may rotate about said axis of rotation.

A first reference abutment element 146 is fixed to the second elongated portion 134 and is adapted for cooperating with reference abutment 128 for limiting the rotation of arm 90 in a clockwise direction (as shown in FIG. 1). A second reference abutment element 148 is coupled to portion 134, opposite to element 146, and a limit stop cap 150 is coupled to nut 112; element 148 and limit stop cap 150 cooperate for limiting the rotation of arm 90 in a direction opposite to the previously mentioned one.

The first portion 132 of arm 90 has a through hole 152.

The support structure 88 also comprises a main supporting frame 154, shown in FIG. 2, with two bars 156, 158 connected by segments 160, 162 coupled (welded) at their ends in such a way that bars 156, 158 are parallel and separated by a longitudinal opening 164 that forms a guide. Frame 154 is coupled to rotary arms 90, 92: more specifically it is fixed to the first elongated portions 132 by means of screws 166, that are inserted through holes 152 and opening 164 and then locked by nuts 168, according to the same method of clamping the various parts of the bench gauge to bed 2.

Sensing or measuring means comprise gauges 170 of the "snap" type (only one of them is shown in FIG. 1) with an integral element 172 that has a coupling portion 174, two shaped end portions 176, 178 that carry feelers 180, 182 adapted for contacting the surface of workpiece 42, and two portions with a thinner section 184, 186 between the end portions and the coupling portion. The portions that have a thinner section 184, 186 allow end portions 176, 178 to accomplish limited rotational displacements with respect to the coupling portion 174. Resilient means 188 adapted for urging the end portions 176, 178 to a mutual approach, limiting means 190 adapted for limiting the reciprocal displacements of end portions 176, 178 and transducer means 192 adapted for emitting electrical signals that depend on said mutual displacements, are coupled to both said end portions 176, 178. Electric cables 278, not shown in FIGS. 1 and 2 but in FIG. 7 only, transmit signals from the transducer means 192 to connector blocks (not shown) and to processing and display units 194.

A hole in portion 174 allows the coupling of gauge 170 to frame 154 by means of a screw 198 that passes through opening 164 and the aforementioned hole and is locked by a nut 200.

Figure 5:
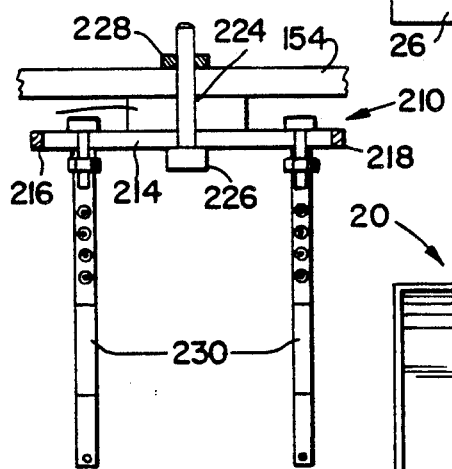
FIG. 5 is a sectional view of a third detail of the bench gauge shown in FIG. 2, along the path V—V in FIG. 2.

An additional support frame 210 comprises two bars 212, 214—that are similar to bars 156, 158 but shorter——and two segments 216, 218 that join the bar ends, an opening 220 being defined between bars 212, 214 so as to provide a guide. With particular reference to FIGS. 2 and 5, a spacer block 222 arranged at the intermediate zone of support frame 210 has a through hole 224 for housing a screw 226; moreover the latter is inserted through openings 220 and 164, and locked to a nut 228 so as to clamp support frame 210 to main frame 154. Second sensing or measuring means, or gauges, 230 similar to gauge 170 are fixed to support frame 210 according to the same coupling method used for coupling gauge 170 to frame 154. However, while the transducer means 192 of gauge 170 can comprise a single transducer, each gauge 230 for diameter checking normally comprises two transducers. Moreover, further gauges for determining axial dimensions can be fixed to support frame 210.

Normally the gauges 170 carried by main frame 154 are used for performing single relevant measurements, while gauges 230 carried by frame 210 are used for carrying out combined measurements (by processing the signals of gauges 230).

The counterweight end portion 142 has a substantially parallelepided shape and is adapted for balancing the weight of the sensing means 170, 230 coupled to frames 154 and 210 located at the opposite side of rotary arm 90.

As the number of gauges 170 on frame 154 can vary and/or depending on the presence or not of frame 210 with relevant gauges 230, it is possible to add to the counterweight end portion 142 additional elements 232, coupled by means of a screw 234 that crosses portion 142 and elements 232 by passing through holes that are not shown in FIG. 1, and is locked by a nut 236. In this way it is possible to keep substantially constant the force required to make arms 90, 92 rotate and bring gauges 170, 230 on to workpiece 42 to be checked.

The shape and the positioning of rest devices 40 and supports 94, 96 of rotary arms 90, 92 are such that the axis of rotation of the support structure 88 and the axis of the workpiece 42 to be checked lie, the first below the second, in a vertical geometrical plane coincident with the viewing plane of FIG. 2.

This arrangement enables to achieve a considerable reduction in the overall dimensions of the whole apparatus and simplifies the (manual or automatic) loading of workpiece 42 on rest devices 40 and at the same time protects the sensing means 170, 230, that are conveniently arranged apart from these devices.

The particular coupling of gauges 170 to frame 154 by means of just one bolt further prevents each of the sensing means 170 from being affected by possible plays due to inexact alignment of the axes of rotation of arms 90, 92, and/or bending of some parts of the apparatus. A similar advantage is ensured to the second sensing means 230 coupled to the additional frame 210 in turn coupled by just one bolt to frame 154: possible misalignments among a plurality of gauges 230 coupled to support frame 210 due, for example, to clearances in the rotations of arms 90, 92 are prevented, allowing an improved accuracy and flexibility in checking axial distances, concentricity, parallelisms, etc. It should be realized that frame 210 can also be connected to frame 154 by means of two bolts positioned sufficiently close together, instead of one, in order to obtain the same result.

It is pointed out that frame 210 does not carry reference devices, such as Vee devices, for cooperating with the workpiece 42 and that the forces between the feelers of gauges 230 and workpiece 42 are very small. Support frame 210 can be much longer than that shown in FIGS. 2 and 5, but it and gauges 230 can be of very limited weight, therefore deformations of the frame 210 due to its own weight and to the weight of gauges 230 are very small, also in view of the coupling of frame 210 at an intermediate zone. Therefore, the external forces and the stresses acting on the support frame 210 only consist, basically, of the forces and stresses occurring at the limited zone next to screw 226 and spacer block 222.

Guide elements or bumpers 240, 242 are coupled to bed 2 by means of bolts, in a quite similar way as for the other elements described up to now—for example like support 94 in the case of arm 90. The guide elements 240, 242 are adapted for limiting in an axial direction the positioning of workpiece 42 (that is not shown in FIG. 2 for simplicity's sake). Threaded through holes 244 in the guide elements (just the one referring to element 242 is shown in a sectional view in FIG. 2) can be used for the initial adjustment of rest devices 40. In this case pointed reference screws 246 are screwed down through said holes 244 with their points opposite to each other so as to carry a master piece in the correct position and suitably adjust devices 40 by setting the position of reference elements 46, 48 onto support member 44. Once the correct arrangement of devices 40 has been reached, pointed screws 246 are unscrewed and the workpieces 42 to be checked are directly placed on said devices.

Figure 6:
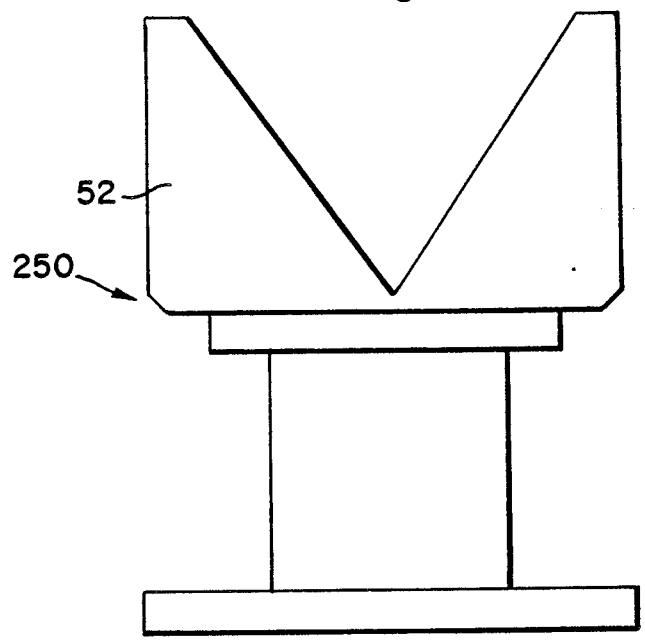
FIG. 6 shows a fourth detail of the bench gauge shown in FIG. 2, along the path VI—VI in FIG. 2.

Furthermore there can be foreseen an additional protection element 250 coupled to bed 2 in a similar way as the others (i.e. locked to the pairs of bars 4, 6 and 8, 10 by means of bolts in correspondence to a portion quite similar to portion 98 shown in FIG. 1); said element 250 is shown in FIG. 6 and comprises a substantially flat and V-shaped portion 252 adapted to be arranged parallel to rest devices 40. The function of element 250 is that of supporting workpiece 42 in the event that the positioning of the rest devices 40 (more specifically of the reference elements 46, 48) is inexact, in order to prevent the workpiece 42 from colliding against other parts of the bench gauge during, for example, the automatic loading operation.

Figure 7:
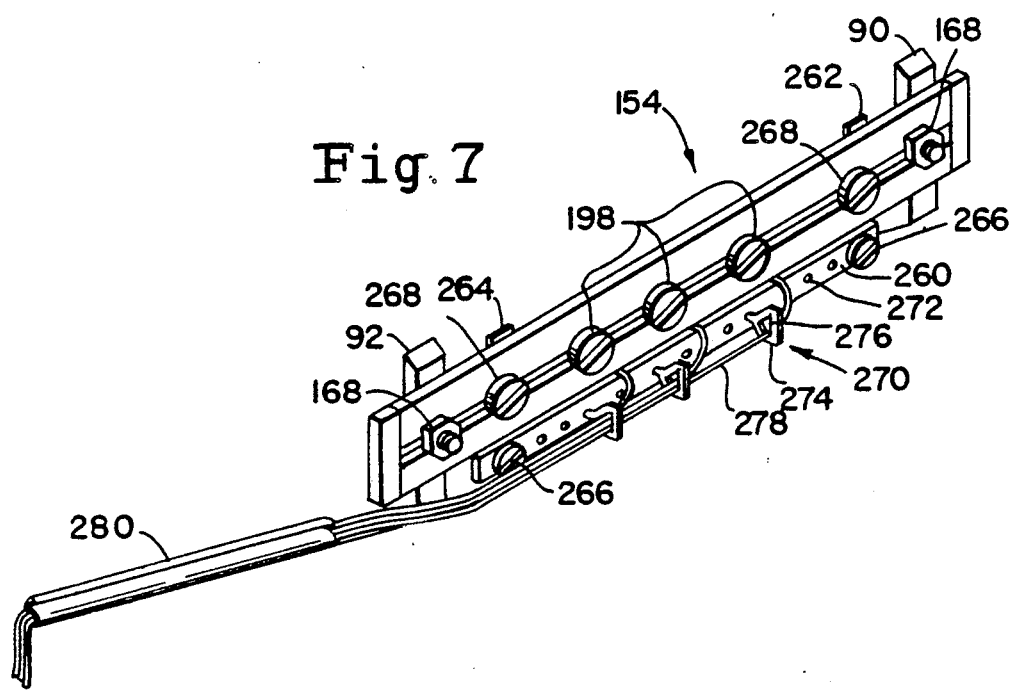
FIG. 7 is a perspective view of a detail of the bench gauge of FIGS. 1 and 2, with a different scale from that of FIGS. 1 and 2.

FIG. 7 schematically shows some details—that are not shown in the other figures—of the bench gauge described up to now. A plate 260 with holes 272 is secured to and below frame 154, by means of two bridge elements 262, 264 and screws and bolts 266 and 268.

Locking elements 270 made of plastic comprise a cylindrical end (not visible in the figure) adapted for insertion in a relevant hole 272 of plate 260, and a substantially annular portion 274 with a slit 276. The locking elements 270 are inserted in holes 272 in correspondence to the position of sensing means 170, 230 coupled to main frame 154 (or to additional frame 210). In FIG. 7, for simplicity's sake, the sensing means are not explicitly shown, but just indicated by associated locking screws 198. Each cable 278 coming out of transducer means 192 of a gauge 170 is inserted through slit 276, in the associated locking element 270 and in all the other elements 270 on plate 260 placed between the relevant gauge and arm 92. All cables 278 so aligned along plate 260 are inserted in a raceway 280 fixed to arm 92 and extending up to pin 144, i.e. the axis of rotation of arm 92. In this way cables 278 can integrally rotate with the movable part of the support structure (90, 92, 154) without being subject to unwanted torsions.

It should be realized that cables 278 can be led to connector blocks (as hereinbefore mentioned) and that said blocks can also be coupled to bed 2 by means of suitable supports comprising a coupling section that is under all aspects similar to portion 98 shown in FIG. 1 and coupled in the same way.

Figure 8:
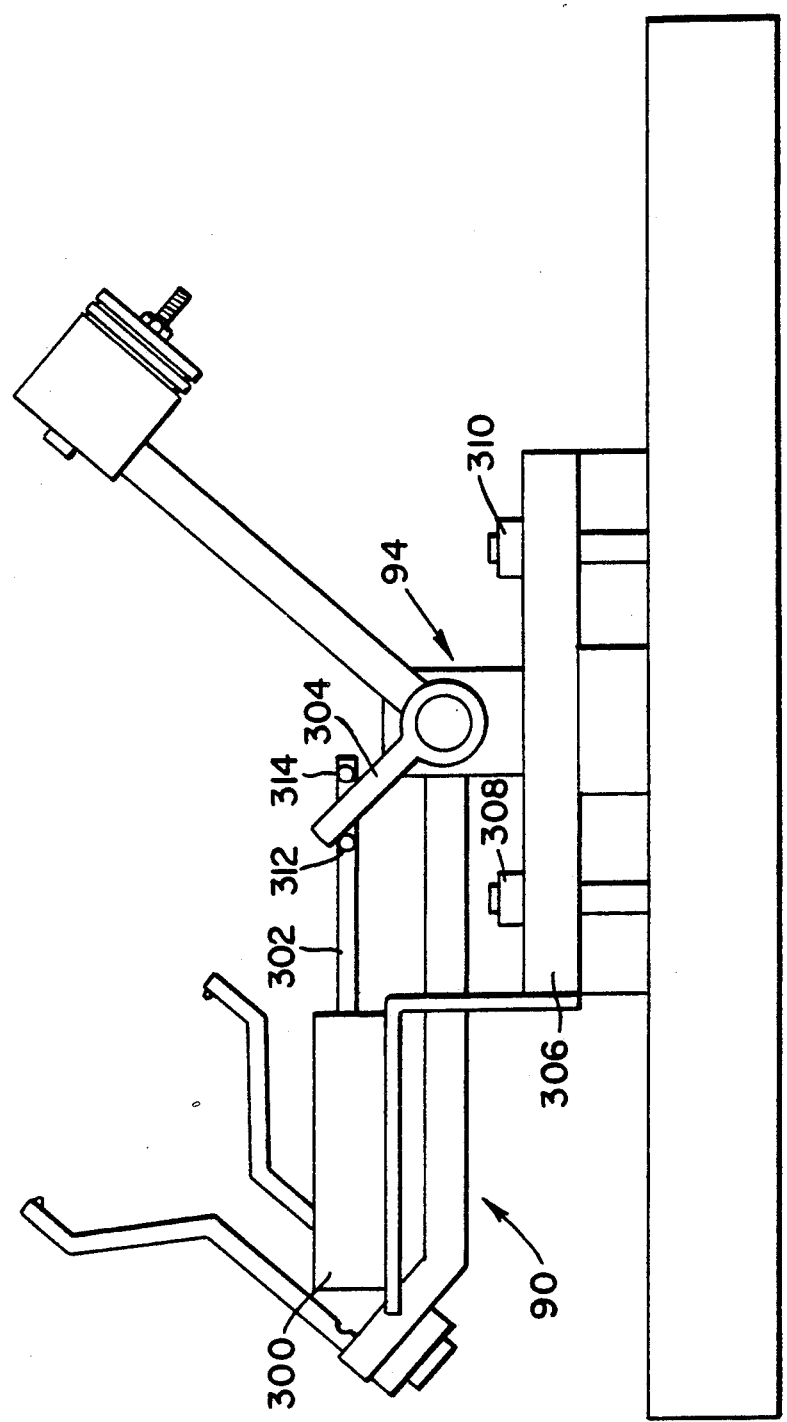
FIG. 8 is a side view of a detail of a bench gauge according to the invention.

The rotation of support structure 88, and consequently the displacement of the sensing means 170, 230 movable with it from a rest position to a working one, in cooperation with workpiece 42 to be checked, can occur in an automatic or manual way. In the first instance—schematically shown in FIG. 8—there are foreseen automatic actuation means comprising a hydraulic actuation system with a cylinder 300 and a piston with an end 302 that engages, by means of limit stop elements 312, 314, a lever 304 rigidly coupled to arm 90 and adapted for rotating about the same axis of rotation of said arm.

Cylinder 300 is coupled, in a way not shown in the figure, to a support 306, in turn secured to bed 2 by means of bolts 308, 310, in a way quite similar to that used for portion 98 shown in FIG. 1.

The automatic actuation of the rotation motion can occur in a similar way by using pneumatic means.

Logic circuits can moreover be coupled to bed 2 by means of supports that are coupled to bed 2 in the way hereinabove repeatedly described (see portion 98 in FIG. 1).

Figure 9A:
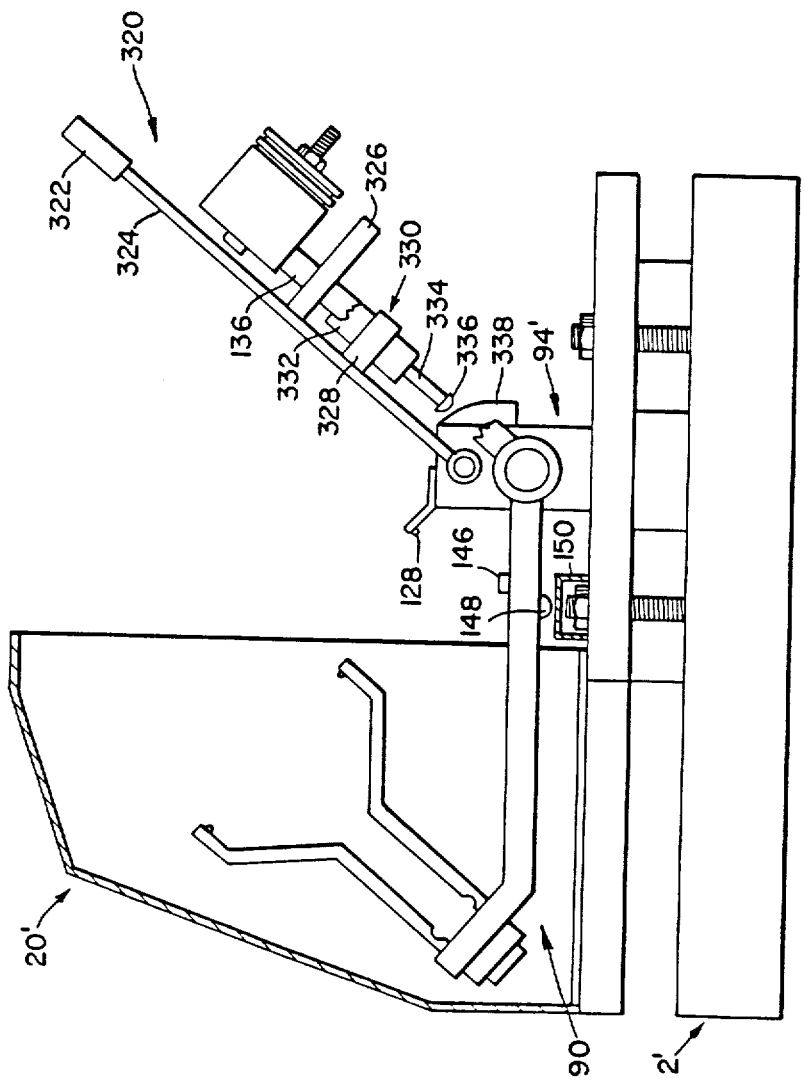
FIGS. 9A and 9B are side views of some elements of a bench gauge according to another embodiment of the invention, at two different moments of operation.
Figure 10:
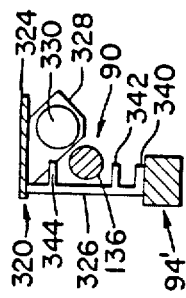
FIG. 10 is a sectional view of a detail of a part shown in FIGS. 9A and 9B, along the section X—X in FIG. 9B.
Figure 9B:
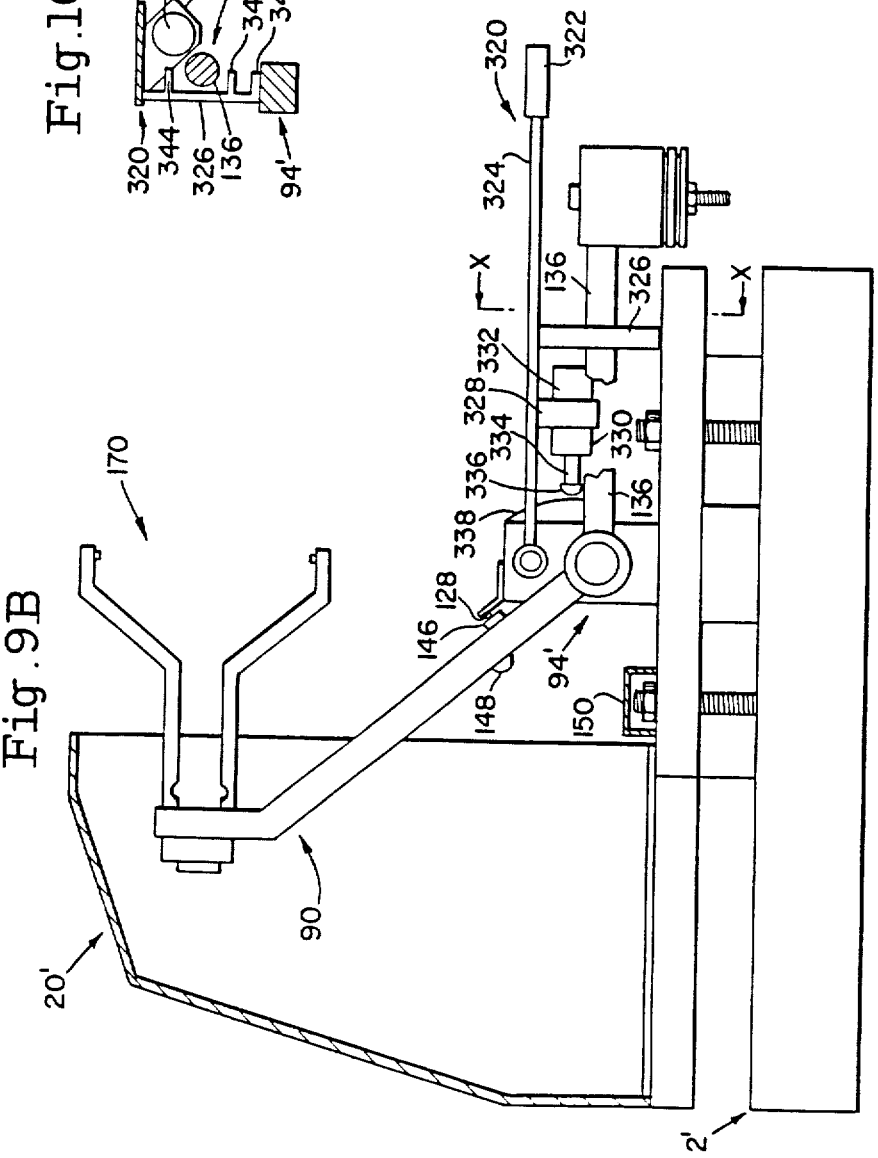
Figure 12:
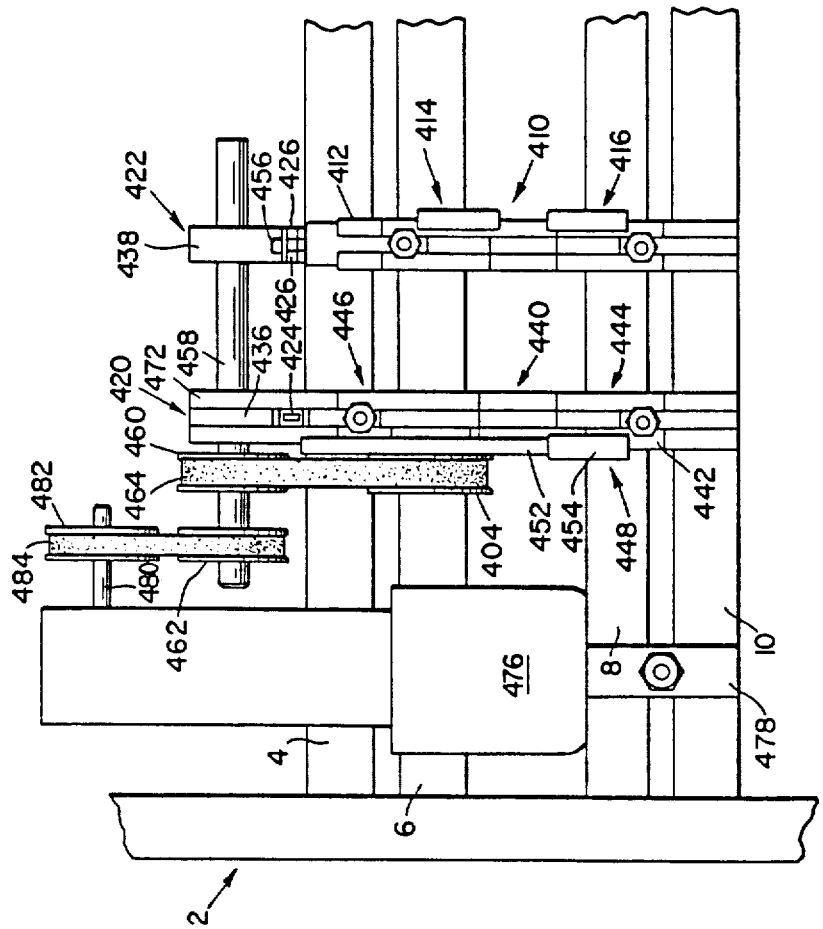

The manual actuation for the displacement of arms 90, 92, as shown in FIGS. 9A, 9B and 10, can be produced by displacing an actuation lever 320 adapted for rotating about an axis that is different from the axis of rotation of arm 90 and is obtained on support devices 94', coupled to a bed 2' in a similar way as that shown in FIG. 1 for the coupling of support 94 to bed 2.

Lever 320 has a handle 322 and a substantially flat elongated portion 324. To this portion 324 there are connected a transmission flange 326 and—by means of a junction element 328—a hydraulic damper 330 with a cylinder 332, a piston axially movable within cylinder 332 and comprising an elongated end 334 protruding from it, and a contact element 336 coupled to said end 334.

A shaped element, or cam, 338 is secured to support devices 94'.

Flange 326, also shown in FIG. 10, has a bent end 340 and limit stop elements 342 and 344, parallel to end 340, adapted for cooperating with diametrally opposite areas of the cylindrical surface of portion 136 of arm 90.

FIG. 9A schematically shows a bench for manual actuation wherein there are shown just bed 2', support devices 94', rotary arm 90 with actuation lever 320 and protection structure 20'. The asymmetric arrangement of bed 2' and protection structure 20' differs from that of the corresponding parts 2 and 20 in FIG. 1; this is due to the operator's need to reach one side of the bench for operating. Arm 90 is shown in FIG. 9A in a rest position, with the sensing means placed at the farthest distance from the workpiece; this distance is defined by the cooperation between the second reference abutment element 148 fixed to arm 90 and limit stop cap 150.

By making lever 320 rotate in a clockwise direction (with reference to FIG. 9A) limit stop element 344 contacts portion 136 of arm 90, forcing the whole arm to rotate in the same direction. From the moment in which contact element 336 contacts the surface of cam 338 the movement of lever 320 and that of arm 90 are dampened. Manually operated lever 320 continues its stroke until bent end 340 of flange 326 contacts a limit stop consisting in a surface portion of support devices 94' (FIG. 9B).

The rotation of arm 90 continues, dampened by damper 330, until contact between reference abutment element 146 and reference abutment 128 (FIG. 9B) occurs, said contact defining the correct position of the sensing means or gauges 170, 230 on the workpiece 42 to be checked.

In order to withdraw the gauges away from the workpiece, lever 320 is actuated so as to rotate in a counterclockwise direction (again reference should be made to FIGS. 9A and 9B) and limit stop element 342 urges the entire arm 90 to rotate in the same direction, in order to return to the position shown in FIG. 9A.

Figure 11:
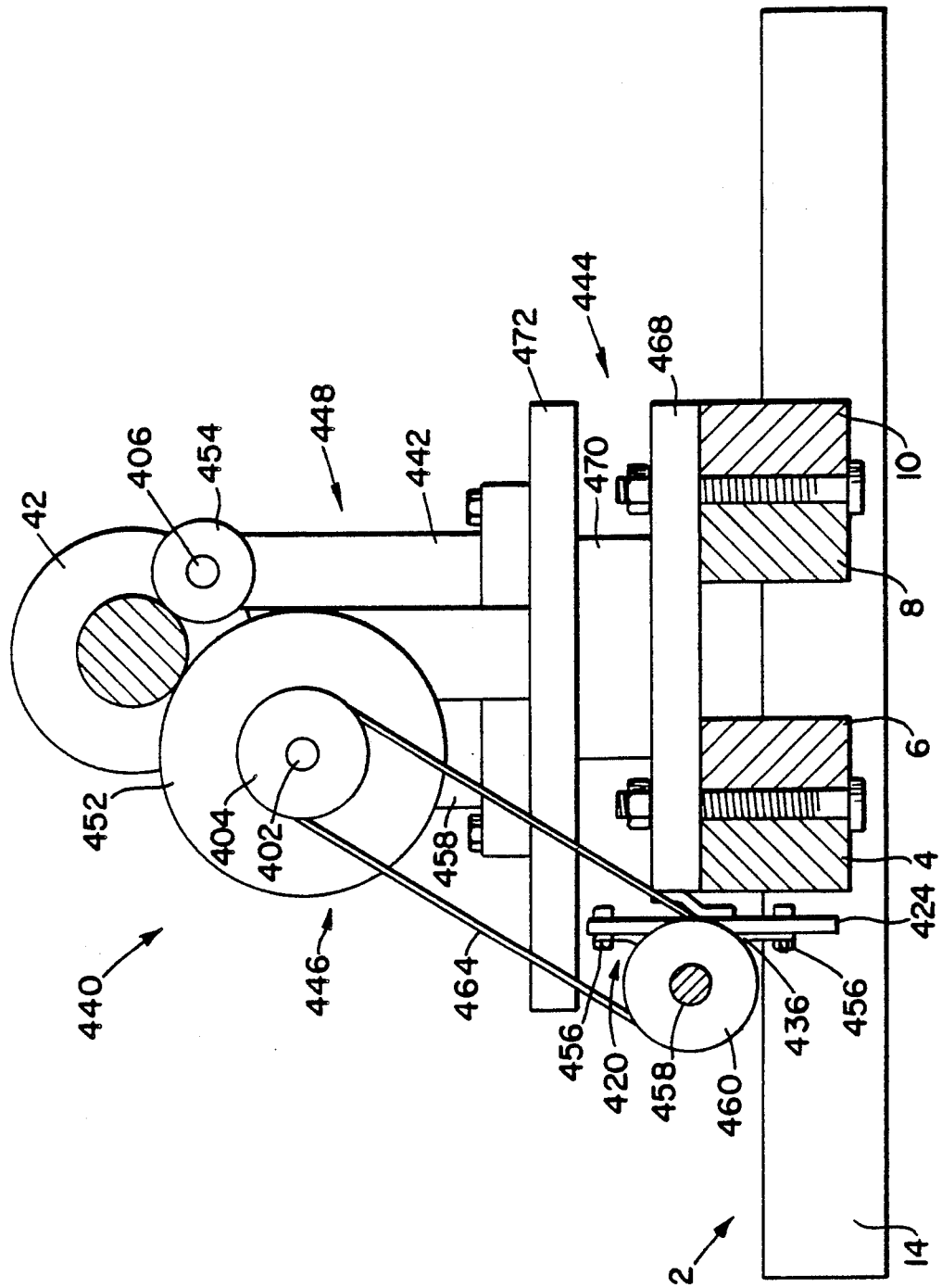
FIG. 11 is a side view of some elements of a bench gauge according to a third embodiment of the invention.
Figure 12:
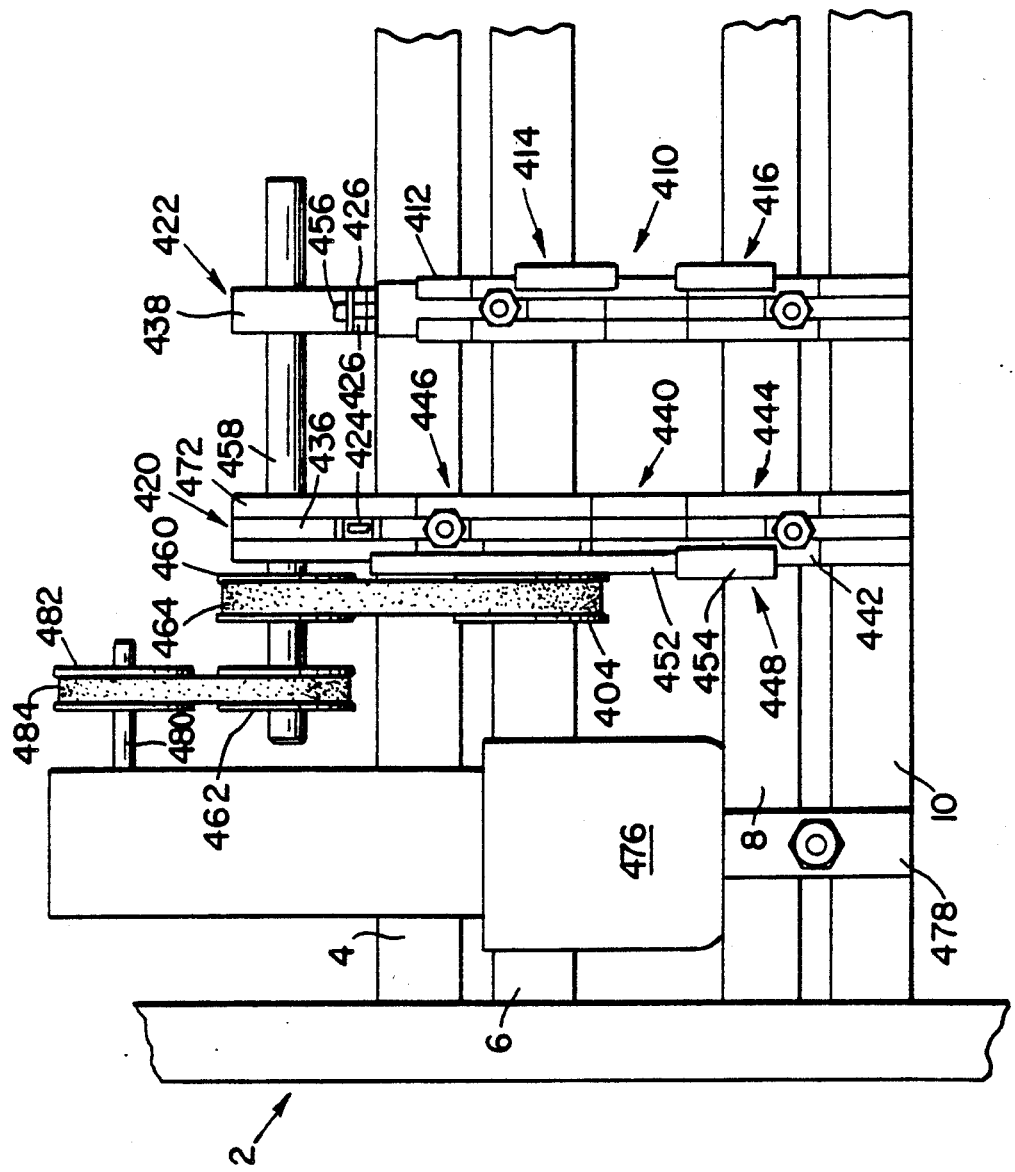
FIG. 12 is a plan view of some elements of a bench gauge according to said third embodiment of the invention.
Figure 1:
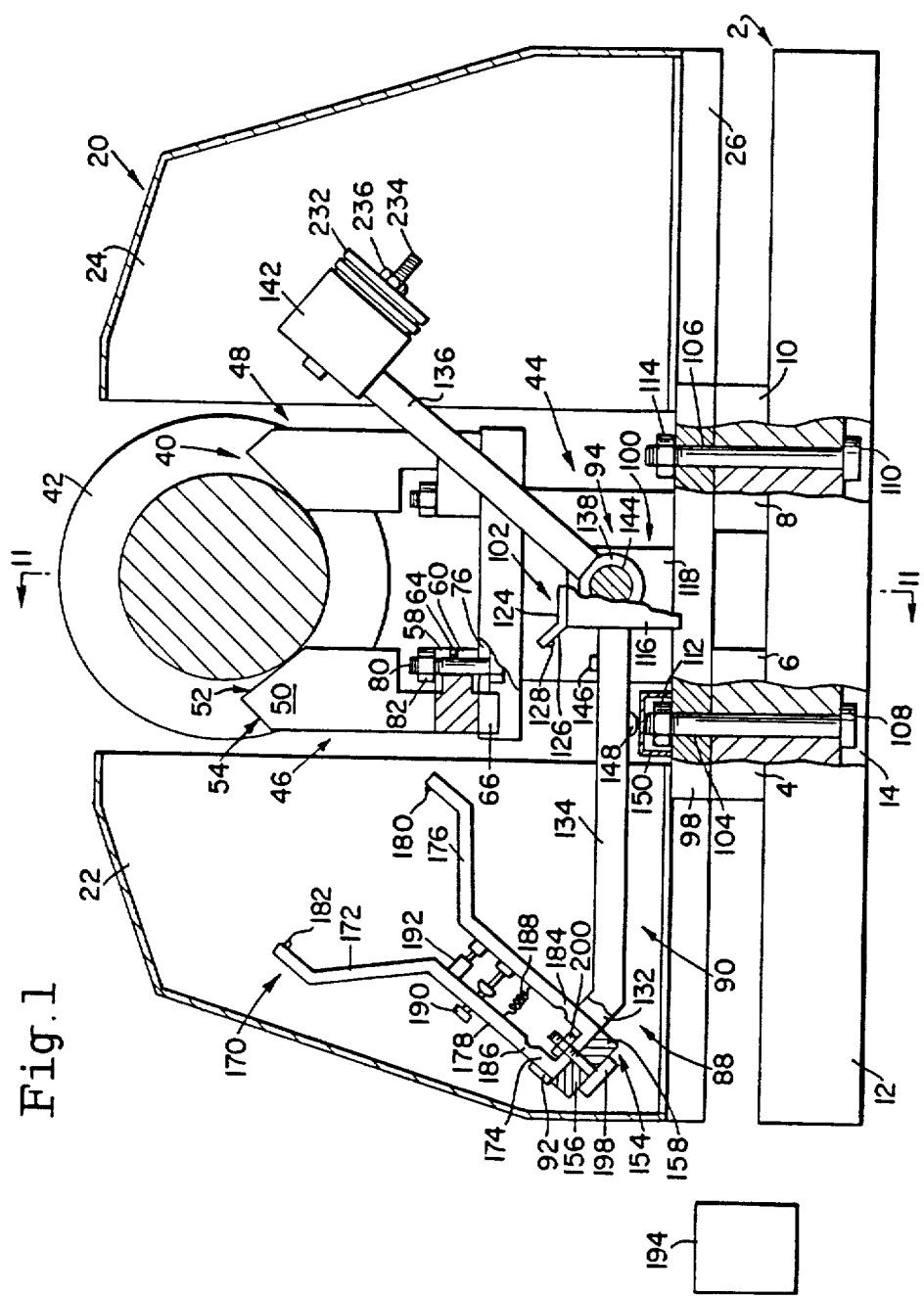

FIGS. 11 and 12 show an embodiment of a bench gauge according to the present invention for checking a workpiece 42 in rotation.

The structure of the bench gauge is similar to that described hereinbefore, with the sole substantial difference in the construction of the rest devices that, in this case, have to drive workpiece 42 to accomplish the required rotation and/or enable this rotation. A rest device 440 is shown in both FIGS. 11 and 12, whereas a second rest device 410 is only shown in FIG. 12. Device 440 has a support member 444, with a coupling portion 468 fixed to bed 2, a central body 470 and a support part 472, all these parts being similar to corresponding parts of device 44.

Two different reference elements 446, 448 are coupled to part 472 in the same way as elements 46, 48 are coupled to part 72 of member 44 (see FIG. 1 and its pertaining description).

Element 446 comprises a support part 450 and a circular element 452 adapted for freely rotating, with respect to part 450, about an axis defined by a pin 402 connected to part 450 in a way not shown in the figure. A first pulley 404 is connected to circular element 452 so as to rotate together and coaxially with it.

Element 448 comprises a second support part 442 and a second circular element 454 for freely rotating with respect to part 442 about an axis defined by a pin 406 coupled to part 442 in a way not shown in the drawing. The circular elements 452, 454 define two relevant cylindrical surfaces lying opposite to each other, which are adapted for simultaneously contacting areas of a same cylindrical portion of the surface of workpiece 42 in such a way as to determine—with the cooperation of the second rest device 410—the correct positioning of the workpiece 42. The position of elements 446, 448 is furthermore adjustable (in a way not shown in the drawings, similar to the one for elements 46, 48 in FIG. 1) to keep fixed the position of the workpiece axis as the nominal dimensions of the different sections of the rest surfaces of the workpieces vary.

The second rest device 410 (visible in FIG. 12 only) comprises a second support member 412 that is substantially similar to member 444 and two second reference elements 414, 416, both substantially similar to element 448, arranged and adjusted in a symmetric way with respect to the axis of workpiece 42, so as to define—together with device 440—the correct positioning of said workpiece 42.

Two vertical support elements 420, 422 are rigidly connected to section 468 of member 444 and to a corresponding part of member 412, and each of them comprises a pair of longitudinal parallel flat bars 424, 426, respectively. Two bearings—not shown in the figures—are connected in a vertically adjustable way to said vertical support elements 420, 422, respectively, by means of junction elements 436, 438 locked by bolts 456 that pass through holes in elements 436, 438 and the opening formed between the pairs of flat bars 424, 426, and are suitably locked. A shaft 458 is supported by the bearings and so lies at one side of bed 2, parallel to bars 4, 6, 8 and 10, free to rotate about its axis. A second and a third pulley 460, 462 are coaxial and rigidly fixed to shaft 458 and adapted to rotate together with it.

The first pulley 404 and the second pulley 460 are substantially coplanar and a belt 464 cooperates with said first and second pulleys in order to transmit to the first (404) the motion of the second (460). Actuation means comprise an electric motor 476 (shown in FIG. 12) that is supported by a support element 478 fixed to bed 2 by means of bolts in the way shown for clamping the other elements of the bench. A spindle 480 coming out of motor 476 carries a fourth pulley 482, that is substantially coplanar to said third pulley 462, and is connected to it by means of a second belt 484. The rotation commanded by motor 476 to the fourth pulley 482 is so transmitted to the third pulley 462 (by means of belt 484), to the second pulley 460 (by means of the rotation of shaft 458), to the first pulley 404 (by means of belt 464) and to workpiece 42 (by means of circular element 452).

As the nominal dimensions of the rest section of workpiece 42 vary, the adjustment of elements 446, 448 causes, among the other things, transversal displacements of circular element 452 and of its associated pulley 404; in order to keep the tension of belt 464 constant, the position of the second pulley 460 is consequently set, by adjusting the vertical position of shaft 458, i.e. of the bearings on support elements 420, 422.

The position of the fourth pulley 482, or that of motor 476, is also set (in a way not shown in the drawing) by effecting transversal adjustments, in order to keep the tension of the second belt 484 substantially constant.

Another embodiment—not shown in the figures—of the apparatus according to the invention, provides for a structure quite similar to that shown in FIGS. 1 and 2, with fixed rest devices 40, and enables to check the workpiece 42 during its rotation. In such embodiment the support and protection means comprise additional support members with two oppositely arranged centres, which are sustained by elements fixed to the bed 2 in the way repeatedly described hereinbefore (for example like devices 40 in FIGS. 1 and 2) and are longitudinally adjustable along guides 16, 18. These centres are aligned to define an axis and can rotate about said axis; a motor is coupled to one of said centres, whereas the other centre ("dead centre") is free to rotate "idle".

The loading of a workpiece 42 to be checked in said apparatus occurs first on the reference devices 40; then the dead centre is brought to contact an end of the workpiece 42 and urges the other end of said workpiece against the other centre in such a way that the axis defined by the centres and the geometrical axis of the workpiece 42 coincide and the workpiece 42 is slightly raised and remains supported by the centres only; then the motor is actuated so as to provide the workpiece rotation.

It should be realized that the workpiece 42 can be pushed by the dead centre towards the other centre without having to approach the stationary workpiece from both sides. This possibility is provided as there are no sensing means coupled to the workpiece rest devices during the workpiece loading phase, and consequently during said phase the sensing means are not subjected to possible slidings and/or damages.

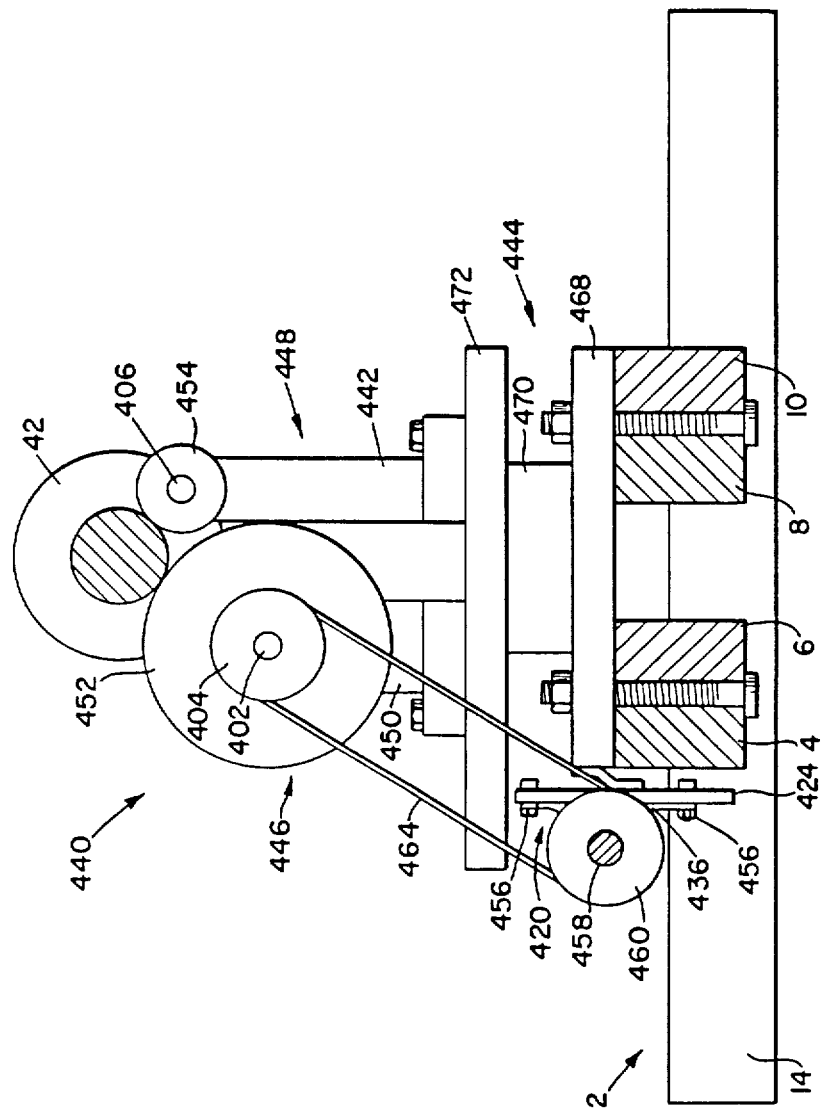

We claim:

1. Apparatus for checking dimensions of workpieces (42), with a support structure (2); reference and support means (40), coupled to the support structure (2) for supporting and positioning the workpiece to be checked (42); a support frame (210) carried by the support structure (2); a plurality of measuring units (230) fixed to the support frame (210) for providing corresponding signals to be processed for performing combined measurements; and coupling means (88) for coupling the support frame (210) to the support structure (2), the coupling locations of the reference and support means (40) and of the support frame (210) being basically different, characterized in that said coupling means (88) comprise a coupling device (222, 226, 228) directly coupled to the support frame (210), substantially in a single limited zone, for limiting the occurrence of external forces applied to the support frame (210) substantially at said single limited zone and preventing substantial deformations of the support frame (210).

2. An apparatus according to claim 1, wherein the support frame (210) is adapted to cooperate with the workpiece (42) basically only through the measuring means (230), for limiting the external forces acting on the support frame (210) substantially to the forces occurring in said limited zone.

3. An apparatus according to claim 2, wherein at least a portion of the support structure (2) and the support frame (210) are mutually movable, for causing the cooperation between the measuring means (230) and the workpiece (42), and the support structure (2) and the coupling means (88) comprise reference means (128, 146, 148, 150) for defining a mutual rest position and a mutual operative position between said portion of the support structure and the support frame (210).

4. An apparatus according to claim 1, wherein said support structure (2) is stationary and defines at least one linear guide (16, 18) for positioning and locking said reference and support means (40), and said coupling means (88) comprise elements (90, 92, 154) movable with respect to the support structure (2), for displacing the measuring units (230) into cooperation with the workpiece (42).

5. An apparatus according to claim 4, wherein said movable elements (90, 92, 154) are coupled to the support structure (2) to define an axis for the rotation of the support frame (210) with respect to the support structure (2).

6. An apparatus for checking dimensions of workpieces (42), comprising: a support structure (2); reference and support means (40), coupled to the support structure (2) for supporting and positioning the workpiece to be checked (42); a support frame (210) carried by the support structure (2); measuring means (230) fixed to the support frame (210), said measuring means comprising a plurality of measuring heads (230), each measuring head being fixed to the support frame (210) at a relevant narrow zone, for preventing deformations of the support frame (210), and coupling means (88) for coupling the support frame (210) to the support structure (2), the coupling locations of the reference and support means (40) and of the support frame (210) being basically different, wherein said coupling means (88) comprise a coupling device (222, 226, 228) directly coupled to the support frame (210), substantially in a single limited zone, for preventing deformations of the support frame (210).

7. An apparatus according to claim 6, wherein said support frame (210) basically comprises a linear guiding and locking device (212, 214, 216, 218), said limited zone being substantially an intermediate zone of the linear guiding and locking device.

8. An apparatus according to claim 6, wherein said measuring heads include heads (230) providing signals adapted to be processed for performing combined measurements.

9. An apparatus for checking dimensions of workpieces (42), comprising:
a stationary support structure (2) defining at least one linear guide (16, 18);
reference and support means (40) adapted to be coupled to said linear guide in adjustable position, for supporting and positioning the workpiece to be checked (42);
a support frame (210) carried by the support structure (2);
coupling means (88) for coupling the support frame (210) to the support structure (2), comprising:
a main support frame (154);
a coupling device (222, 226, 228) coupling the support frame (210) to the main supporting frame (154), substantially in a single limited zone, for preventing deformations of the support frame (210), the location of said single limited zone being basically different from the locations where the reference and support means (40) are coupled to said linear guide (16, 18); and
elements (90, 92, 154) for coupling the main supporting frame (154) to the support structure (2), these elements being movably coupled to the support structure (2) to define an axis for the rotation of the main supporting frame (154) and of the support frame (210) with respect to the support structure (2); and
measuring means including first measuring means (230) fixed to the support frame (210) and measuring heads (170) carried by the main supporting frame (154), the measuring means being displaceable into cooperation with the workpiece (42) through rotation of the main supporting frame (154) and of the support frame (210) about said axis.

10. An apparatus according to claim 9, wherein the measuring means (230) are provided for performing combined measurements and the measuring heads (170) carried by the main supporting frame (154) are provided for performing single relevant measurements.

* * * * *

UNITED STATES PATENT AND TRADEMARK OFFICE
CERTIFICATE OF CORRECTION

PATENT NO. : 5,068,974
DATED : December 3, 1991
INVENTOR(S) : Mario Possati et al It is certified that error appears in the above-identified patent and that said Letters Patent is hereby corrected as shown below:

The drawing sheets, consisting of Figs. 1-12, should be deleted to be replaced with the drawing sheets, consisting of Figs. 1-12, as shown on the attached pages.

Signed and Sealed this

Thirteenth Day of July, 1993

Attest:

MICHAEL K. KIRK

Attesting Officer        Acting Commissioner of Patents and Trademarks

Figure 3:
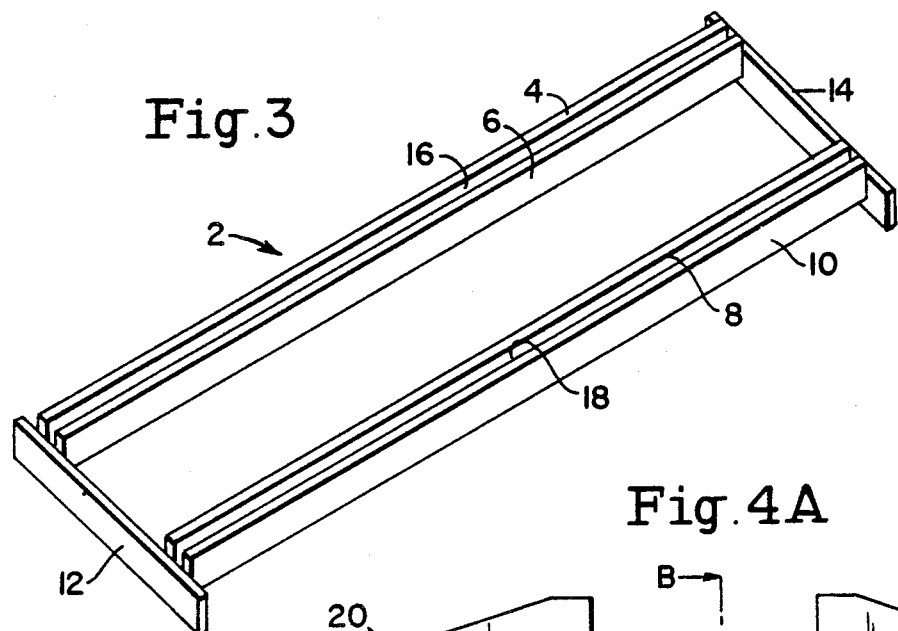
FIG. 3 is a perspective view of a detail of the bench gauge shown in FIGS. 1 and 2, with a different scale as compared to that of FIGS. 1 and 2.
Figure 4B:
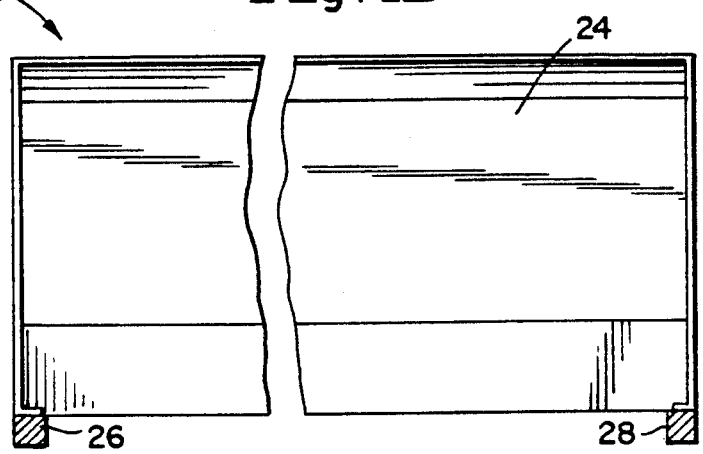

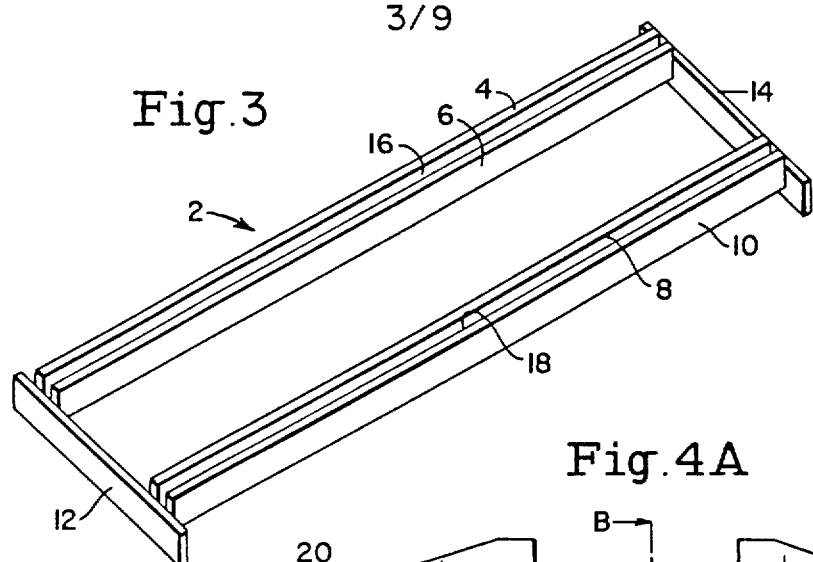
Fig.3
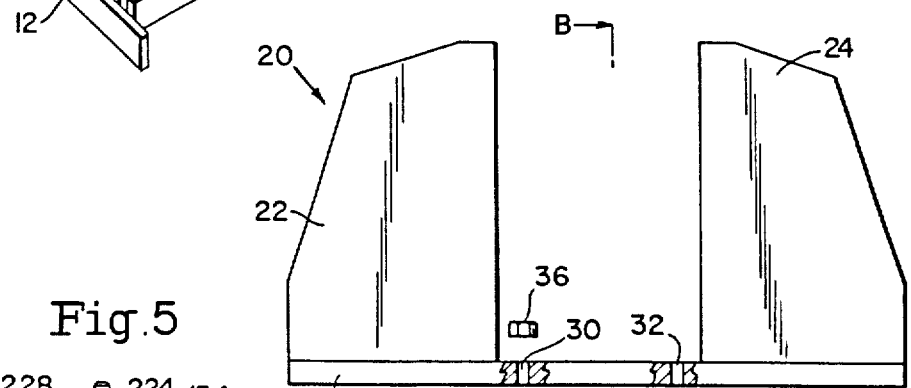
Fig.4A
Fig.5
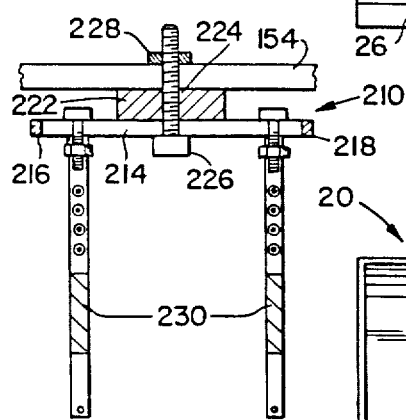
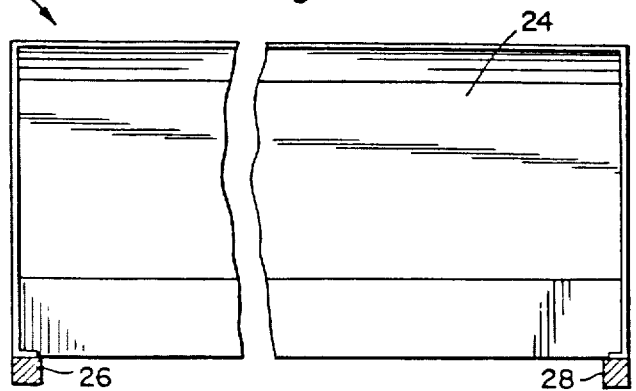
Fig.4B